United States Patent
Ogawa et al.

(10) Patent No.: US 11,601,039 B2
(45) Date of Patent: Mar. 7, 2023

(54) POWER CONVERTER CONTROL SYSTEM USING FIXED PULSE PATTERN, AND CONTROL METHOD

(71) Applicant: MEIDENSHA CORPORATION, Tokyo (JP)

(72) Inventors: Ryuichi Ogawa, Numazu (JP); Masashi Takiguchi, Fuji (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/628,968

(22) PCT Filed: Mar. 30, 2020

(86) PCT No.: PCT/JP2020/014459
§ 371 (c)(1),
(2) Date: Jan. 21, 2022

(87) PCT Pub. No.: WO2021/014690
PCT Pub. Date: Jan. 28, 2021

(65) Prior Publication Data
US 2022/0320994 A1 Oct. 6, 2022

(30) Foreign Application Priority Data

Jul. 23, 2019 (JP) .............................. JP2019-134958

(51) Int. Cl.
*H02M 1/12* (2006.01)
*H02M 1/08* (2006.01)
*H02M 7/483* (2007.01)

(52) U.S. Cl.
CPC .............. *H02M 1/12* (2013.01); *H02M 1/08* (2013.01); *H02M 7/483* (2013.01)

(58) Field of Classification Search
CPC ........... H02M 1/12; H02M 1/08; H02M 7/483
See application file for complete search history.

(56) References Cited

U.S. PATENT DOCUMENTS 10,093,199 B2 10/2018 Yamamoto et al.
10,418,902 B1 * 9/2019 Dharmalinggam ..... H02M 1/08
(Continued)

FOREIGN PATENT DOCUMENTS

JP 2013-215041 A 10/2013
JP 2014-143831 A 8/2014
(Continued)

OTHER PUBLICATIONS

Tsukakoshi et al., Method for Obtaining Fixed Pulse Pattern Suitable for Harmonic Regulation in Large-Capacity PWM Rectifier Systems, The Institute of Electrical Engineers of Japan, 2011,9 pages.
(Continued)

*Primary Examiner* — Kyle J Moody
(74) *Attorney, Agent, or Firm* — Foley & Lardner LLP

(57) ABSTRACT

A minimum number of levels required to output a target modulation ratio is determined. Additionally, determining a total number of voltage orders to be controlled among a voltage fundamental wave and harmonics of power converter, comparing the minimum number of levels and the total number of voltage orders to be controlled, and fixing a larger one as a number of switching times in a quarter cycle for the target modulation ratio are performed. Further, when the total number is fixed, a shape of an output voltage is determined, and based on the target modulation ratio and the number of switching times in the quarter cycle, a determination of switching phases is made, in addition to a derivation of the pulse pattern for one cycle by which each output voltage level is used according to the target modulation ratio and the output voltage shape, and the phase is determined.

10 Claims, 7 Drawing Sheets

SYSTEM BLOCK DIAGRAM OF EMBODIMENT 1

(56) References Cited

U.S. PATENT DOCUMENTS

| 11,095,242 B2* | 8/2021 | Glose | H02M 1/12 |
| 11,398,791 B2* | 7/2022 | Geyer | H02P 27/12 |
| 2017/0294864 A1 | 10/2017 | Tada et al. | |
| 2017/0302154 A1 | 10/2017 | Tada et al. | |

FOREIGN PATENT DOCUMENTS

| JP | 6270696 B2 | 1/2018 |
| WO | WO 2016/104370 A1 | 6/2016 |

OTHER PUBLICATIONS

Extended European Search Report, European Application No. 20844730.0, dated Jul. 8, 2022.

Leon M. Tolbert et al., "Multilevel PWM Methods at Low Modulation Indices", IEEE Transactions on Power Electronics, Institute of Electrical and Electronics Engineers, vol. 15, No. 4, Jul. 2000, pp. 719-725.

* cited by examiner

DEFINITION OF THE NUMBER OF TIMES OF SWITCHING

SYSTEM BLOCK DIAGRAM OF EMBODIMENT 1

PULSE PATTERN DERIVATION FLOW CHART

RELATIONSHIP (1) BETWEEN OUTPUT VOLTAGE OF SEVEN-LEVEL INVERTER AND MODULATION RATIO

RELATIONSHIP (2) BETWEEN OUTPUT VOLTAGE OF SEVEN-LEVEL INVERTER AND MODULATION RATIO

EXAMPLE OF SHAPE OF OUTPUT VOLTAGE (where L_duty=2, N=4)

EXPANSION OF VOLTAGE UTILIZATION REGION BY SUPERIMPOSITION OF THIRD-ORDER HARMONIC

REVERSED-PHASE SUPERIMPOSITION OF THIRD-ORDER HARMONIC

POWER CONVERTER CONTROL SYSTEM USING FIXED PULSE PATTERN, AND CONTROL METHOD

TECHNICAL FIELD

The present invention relates to a method of pulse modulation in a system that outputs a voltage using an inverter.

BACKGROUND ART

Consider a system in which an input three-phase AC voltage is converted into a DC voltage by a rectifier (a diode rectifier, a PWM converter, a 120-degree conduction converter, etc.) and the DC voltage is output as an AC voltage having a desired frequency and a desired amplitude by an inverter.

In such a system, a triangular-wave comparison PWM that expresses a target voltage on average in one cycle of a carrier is often used for an output of a power converter. However, there is a case where a modulation method other than the triangular-wave comparison PWM is used for the purpose of optimizing a voltage output, and a fixed pulse pattern method is an example of the modulation method. In this method, an optimum pulse pattern for evaluation indexes is derived and converted into a table (or tabulated) in advance, and switching is performed according to the table.

As the evaluation indexes, they are the number of times of switching, a voltage fundamental wave, a voltage harmonic (or a voltage higher harmonic), and the like. Among such evaluation indexes, attention is paid to the number of switching times or the number of pulses. For example, Non-Patent Document 1 describes a method of deriving a pulse pattern in consideration of the voltage fundamental wave and a current harmonic (or a current higher harmonic). Here, assuming that a triangular-wave comparison PWM at a carrier frequency of 9 times that of a power supply cycle is the minimum number of pulses, the number of pulses in a half cycle of an output voltage is set to 5.

Further, in Patent Document 1, for a three-level converter or a three-level inverter, as measures against narrowing of a pulse width at a time of expression of a low modulation ratio, a pulse pattern in which the number of pulses is reduced from 5 to 3 is used in the low modulation ratio, and its switching method is discussed.

Regarding the fixed pulse pattern, a switching phase is determined in consideration of two of the voltage fundamental wave and the voltage (or current) harmonic on the premise of information on the number of switching times, a pulse shape (or a pulse form) and a target modulation ratio.

Since the number of switching times and the pulse shape, which are the premises, affect accuracy of the voltage fundamental wave and magnitude of the voltage harmonic, especially in a case of multi-level, it is necessary to appropriately change setting according to the modulation ratio. It is also important that a maximum level must be output at a time of expression of a high modulation ratio.

In a case of a two-level or three-level inverter for which derivation of the fixed pulse pattern is studied well, since the output becomes the maximum level only by outputting +1 or −1 level, performing the derivation with the number of pulses being fixed is the basics.

However, in the multi-level inverter, the number of switching times required to output the maximum level may be greater than the number of switching times desired to be provided for suppression of the harmonic. In that case, in the high modulation ratio, the number of switching times is determined depending on restriction of the number of levels.

CITATION LIST

Patent Document

Patent Document 1: Japanese Patent No. 6270696

Non-Patent Document

Non-Patent Document 1: Masahiko Tsukakoshi, Kouki Matsuse, "Method for Obtaining Fixed Pulse Pattern Suitable for Harmonic Regulation in Large-Capacity PWM Rectifier Systems", The transactions of the Institute of Electrical Engineers of Japan. D, A publication of Industry Applications Society 131(3), 2011

SUMMARY OF THE INVENTION

In the cases of Non-Patent Document 1 and Patent Document 1, since a three-level power converter is a main application target of the Non-Patent Document 1 and Patent Document 1, a problem peculiar to the multi-level inverter in determination of the number of switching times (the number of pulses) cannot be solved.

In the multi-level inverter, in order to output the maximum modulation ratio, a maximum voltage level must be output within one cycle of the output. That is, if the set number of switching times is too small, the maximum voltage level cannot be output, then the high modulation ratio cannot be expressed. Conversely, if the number of switching times is unnecessarily or indiscriminately increased, a switching loss increases, then this leads to an increase in size of the device.

The present invention is an invention that can solve the above problem. An object of the present invention is to provide a control system and a control method of the power converter by the fixed pulse pattern which is capable of performing control of the fixed pulse pattern method at the optimum number of switching times according to the modulation ratio.

A control system of a power converter by a fixed pulse pattern recited in claim 1, to solve the above problem, is a system having a pulse pattern table in which a pulse pattern by which each output voltage level according to a target modulation ratio and a phase is determined is tabulated, configured to generate a gate signal based on the output voltage level, corresponding to commands of an input target modulation ratio and an input phase, of the pulse pattern table, and configured to control a semiconductor element of the power converter by the generated gate signal, and the control system comprises: a pulse pattern derivation unit configured to determine a minimum number of levels required to output the target modulation ratio, determine the total number of voltage orders to be controlled among a voltage fundamental wave and harmonics of the power converter, compare the determined required minimum number of levels and the determined total number of voltage orders to be controlled, and fix a larger one as the number of switching times N in a quarter cycle for the target modulation ratio, based on the target modulation ratio and the fixed number of switching times N in the quarter cycle, determine switching phases for N times so as to be able to reduce a desired-order harmonic, with a voltage fundamental wave by an expression (4) being set for the target modulation ratio, in terms of harmonics by an expression (5) or an expression (6)

$$d\_ref = \frac{4}{L\_high \cdot \pi}(\cos\theta_A + \cos\theta_B + \cdots + \cos\theta_N) \quad (4)$$

$$V_n = \frac{4}{L\_high \cdot n\pi}(\cos n\theta_A + \cos n\theta_B + \cdots + \cos n\theta_N) \quad (5)$$

$$I_n = \frac{4}{L\_high \cdot n^2\pi}(\cos n\theta_A + \cos n\theta_B + \cdots + \cos n\theta_N) \quad (6)$$

(where d_ref is the target modulation ratio, Vn is a voltage nth-order harmonic amplitude, In is a current nth-order harmonic amplitude, L_high is a maximum number of output levels of the power converter, N is the number of switching times in the quarter cycle, θA . . . θN are respective switching phases, and regarding a sign before a cos function, if a direction of a level change by switching is positive, the sign is +, whereas if the direction of the level change by the switching is negative, the sign is −), and based on the target modulation ratio and the determined switching phases for N times, derive the pulse pattern for one cycle by which each output voltage level according to the target modulation ratio and the phase is determined.

As the control system of the power converter by the fixed pulse pattern recited in claim 2, in claim 1, the minimum number of levels required to output the target modulation ratio is determined so as to satisfy an expression (2)

$$\frac{L\_duty - 1}{L\_high} < d\_ref < \frac{L\_duty}{L\_high} \quad (2)$$

(where d_ref is the target modulation ratio, L_duty is the required minimum number of levels, and L_high is the maximum number of output levels of the power converter).

As the control system of the power converter by the fixed pulse pattern recited in claim 3, in claim 1, the minimum number of levels required to output the target modulation ratio when superimposing a third-order harmonic on the fundamental wave of an output voltage of the power converter is determined so as to satisfy an expression (8) or an expression (9)

$$\frac{2}{\sqrt{3}} \frac{L\_duty - 1}{L\_high} < d\_ref < \frac{2}{\sqrt{3}} \frac{L\_duty}{L\_high} \quad (8)$$

$$(1 + K)\frac{L\_duty - 1}{L\_high} < d\_ref < (1 + K)\frac{L\_duty}{L\_high} \quad (9)$$

(where d_ref is the target modulation ratio, L_duty is the required minimum number of levels, L_high is the maximum number of output levels of the power converter, and K is a multiple of an amplitude of the harmonic with respect to the fundamental wave, and 0≤K).

As the control system of the power converter by the fixed pulse pattern recited in claim 4, in any one of the preceding claims 1 to 3, the total number of voltage orders to be controlled is determined using an expression (4) and an expression (5) or (6)

$$d\_ref = \frac{4}{L\_high \cdot \pi}(\cos\theta_A + \cos\theta_B + \ldots + \cos\theta_N) \quad (4)$$

$$V_n = \frac{4}{L\_high \cdot n\pi}(\cos n\theta_A + \cos n\theta_B + \ldots + \cos n\theta_N) \quad (5)$$

$$I_n = \frac{4}{L\_high \cdot n^2\pi}(\cos n\theta_A + \cos n\theta_B + \ldots + \cos n\theta_N) \quad (6)$$

(where d_ref is the target modulation ratio, Vn is the voltage nth-order harmonic amplitude, In is the current nth-order harmonic amplitude, L_high is the maximum number of output levels of the power converter, N is the number of switching times in the quarter cycle, θA . . . θN are the respective switching phases, and regarding the sign before the cos function, if the direction of the level change by switching is positive, the sign is +, whereas if the direction of the level change by the switching is negative, the sign is −).

As the control system of the power converter by the fixed pulse pattern recited in claim 5, in any one of the preceding claims 1 to 3, the total number of voltage orders to be controlled is determined according to the target modulation ratio.

As the control system of the power converter by the fixed pulse pattern recited in claim 6, in any one of the preceding claims 1 to 5, when the total number of voltage orders to be controlled is fixed as the number of switching times in the quarter cycle for the target modulation ratio, one of shapes of an output voltage of the power converter, which are determined by the required minimum number of levels and the fixed number of switching times in the quarter cycle, is selected.

As the control system of the power converter by the fixed pulse pattern recited in claim 7, in any one of the preceding claims 1 to 5, when the total number of voltage orders to be controlled is fixed as the number of switching times in the quarter cycle for the target modulation ratio, pulse pattern derivation for all shapes of an output voltage of the power converter, which are determined by the required minimum number of levels and the fixed number of switching times in the quarter cycle, is performed by the pulse pattern derivation unit, and a shape of the output voltage of the power converter by which the harmonics can be suppressed more is adopted.

As the control system of the power converter by the fixed pulse pattern recited in claim 8, in any one of the preceding claims 1 to 7, the power converter is a power converter having four levels or more.

As the control system of the power converter by the fixed pulse pattern recited in claim 9, in any one of the preceding claims 1 to 7, the power converter is a serial multiplex inverter having five levels or more.

A method of controlling a power converter by a fixed pulse pattern for controlling a semiconductor element of the power converter by a pulse pattern by which each output voltage level according to a target modulation ratio and a phase is determined recited in claim 10, comprises: a step of determining a minimum number of levels required to output the target modulation ratio; a step of determining the total number of voltage orders to be controlled among a voltage fundamental wave and harmonics of the power converter; a step of comparing the determined required minimum number of levels and the determined total number of voltage orders to be controlled, and fixing a larger one as the number of switching times N in a quarter cycle for the target modulation ratio; a step of, based on the target modulation ratio and the fixed number of switching times N in the quarter cycle, determining switching phases for N times so as to be able to reduce a desired-order harmonic, with a voltage fundamental wave by an expression (4) being set for the target modulation ratio, in terms of harmonics by an expression (5) or an expression (6)

$$d\_ref = \frac{4}{L\_high \cdot \pi}(\cos\theta_A + \cos\theta_B + \ldots + \cos\theta_N) \quad (4)$$

$$V_n = \frac{4}{L\_high \cdot n\pi}(\cos n\theta_A + \cos n\theta_B + \ldots + \cos n\theta_N) \quad (5)$$

$$I_n = \frac{4}{L\_high \cdot n^2\pi}(\cos n\theta_A + \cos n\theta_B + \ldots + \cos n\theta_N) \quad (6)$$

(where d_ref is the target modulation ratio, Vn is a voltage nth-order harmonic amplitude, In is a current nth-order harmonic amplitude, L_high is a maximum number of output levels of the power converter, N is the number of switching times in the quarter cycle, θA . . . θN are respective switching phases, and regarding a sign before a cos function, if a direction of a level change by switching is positive, the sign is +, whereas if the direction of the level change by the switching is negative, the sign is −); a step of, based on the target modulation ratio and the determined switching phases for N times, deriving the pulse pattern for one cycle by which each output voltage level according to the target modulation ratio and the phase is determined; a step of tabulating the derived pulse pattern; a step of generating a gate signal based on the output voltage level, corresponding to commands of an input target modulation ratio and an input phase, of the pulse pattern table; and a step of controlling the semiconductor element of the power converter by the generated gate signal.

(1) According to the invention recited in claims 1 to 10, the pulse pattern with the optimum number of switching times according to the modulation ratio can be derived, and the control of the fixed pulse pattern method at the optimum number of switching times can be realized.

It is therefore possible to perform the control that surely achieves the expression of the fundamental wave in the high modulation ratio and perform the control that achieves the suppression of the harmonics in the middle to low modulation ratios.

Further, it is possible to solve the problem peculiar to the multi-level inverter which is that in order to output the maximum modulation ratio, a maximum voltage level must be output within one cycle of the output, which cannot be solved by the systems or methods of the prior art documents (Patent Document 1 and Non-Patent Document 1).

(2) According to the invention recited in claim 3, improvement in the voltage utilization rate and reduction in the harmonics can be possible. That is, when the third-order harmonic is superimposed on the fundamental wave of the output voltage of the power converter, the high modulation ratio can be expressed by the smaller required minimum number of levels. In addition, when the third-order harmonic is superimposed in the reversed phase on the fundamental wave of the output voltage of the power converter, the region where the high levels can be used even in the low modulation ratio is expanded, then an excellent harmonic suppression effect can be expected.

EMBODIMENTS FOR CARRYING OUT THE INVENTION

In the following description, although embodiments of the present invention will be described with reference to the drawings, the present invention is not limited to the following embodiments. In the present invention, in consideration of circumstances in which restrictions of a high modulation ratio and a maximum level for a fixed pulse pattern have not been studied well or studied much, control to change the number of times of switching according to the modulation ratio is carried out. That is, for instance, in a case of the high modulation ratio, the number of switching times is set to a minimum number of switching times at which the maximum level is output, whereas in cases of middle/low modulation ratios, the number of switching times is set to a minimum number of switching times at which harmonics (or higher harmonics) can be sufficiently suppressed.

In the present invention, a pulse pattern table for the pulse pattern in which the number of switching times is different depending on the modulation ratio at a time of derivation of the pulse pattern is derived in advance. The number of switching times is determined based on a harmonic suppression order and a working voltage level (or a usage voltage level).

In the following, considering that interpretation of a voltage pulse of multi-level becomes complicated, an output voltage is not considered by the number of pulses, but is considered with the output voltage being divided into single level changes. At this time, change in voltage level by one step is treated as one switching. Unless otherwise specified, "the number of switching times (of pulse pattern)" indicates the number of switching times in one cycle of an output voltage phase, and "the number of switching times in a quarter cycle" indicates the number of switching times in a phase θ of "0 [rad]<θ<π/2 [rad]".

Figure 1:
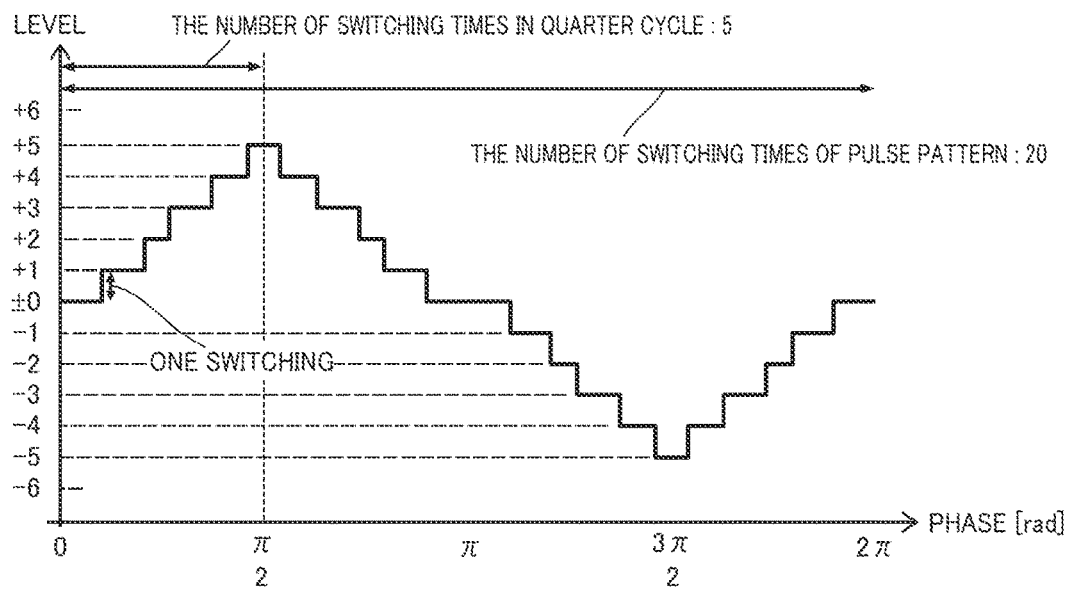
FIG. 1 is an explanatory diagram showing a definition of the number of times of switching in embodiments of the present invention.

FIG. 1 shows a diagram of these conceptions. In a case of a waveform of FIG. 1, the number of switching times in the quarter cycle is 5, and the number of switching times in one cycle, i.e. the number of switching times of the pulse pattern, is 20.

Embodiment 1

Figure 2:
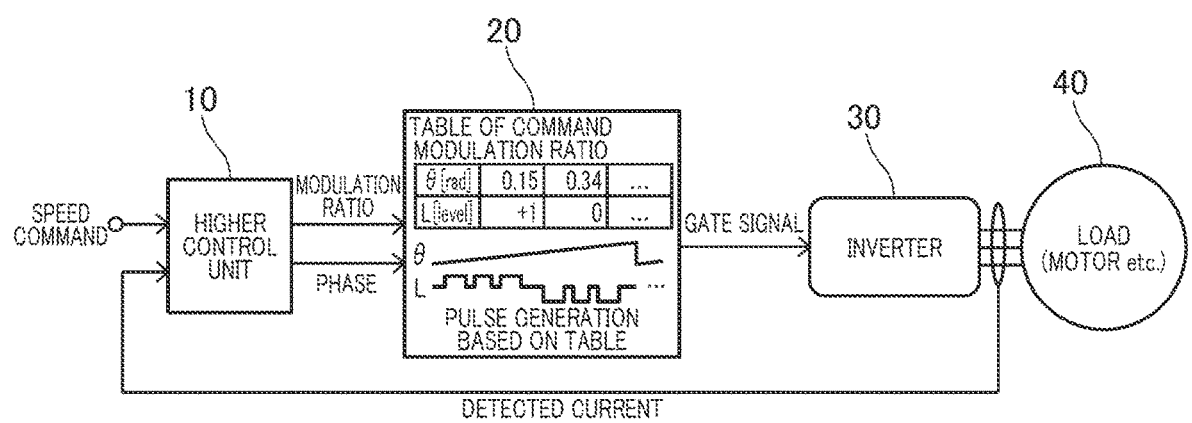
FIG. 2 is a system block diagram of an embodiment 1 of the present invention.

FIG. 2 illustrates a system block diagram of an embodiment 1. In FIG. 2, a reference sign 10 denotes a higher control unit, a reference sign 20 denotes a pulse generation unit, a reference sign 30 denotes an inverter and a reference sign 40 denotes a load. Higher control of the higher control unit 10 is control existing upstream of pulse generation, and for instance, it indicates control whose system inputs a speed command based on a control panel operation amount and a detected three-phase current of the inverter 30 and generates commands of a modulation ratio and a phase through speed control and current control.

After the modulation ratio and the phase are output from the higher control unit 10, the pulse generation unit 20 refers to an internal pulse pattern table on the basis of these information and generates pulses. Information on pulse pattern produced in advance by a pulse pattern derivation unit (not shown) is stored in the pulse pattern table, and an output voltage level according to the information on the modulation ratio and the phase is determined in the pulse pattern table.

A gate signal based on the output voltage level is output from the pulse generation unit 20, then the inverter 30 is driven by this gate signal. The inverter 30 is connected to the load 40 such as a motor, and a voltage according to the gate signal is applied to the load 40.

FIG. 2 is an example of a typical system configuration of power conversion by a fixed pulse pattern method, but an application target of the present invention is not limited to this system configuration. For instance, it could be a system in which, in converter control that performs regeneration to a power supply, switching is performed on the basis of the pulse pattern table derived in advance. The important thing is to drive the power converter using the table of the pulse pattern produced in advance.

Figure 3:
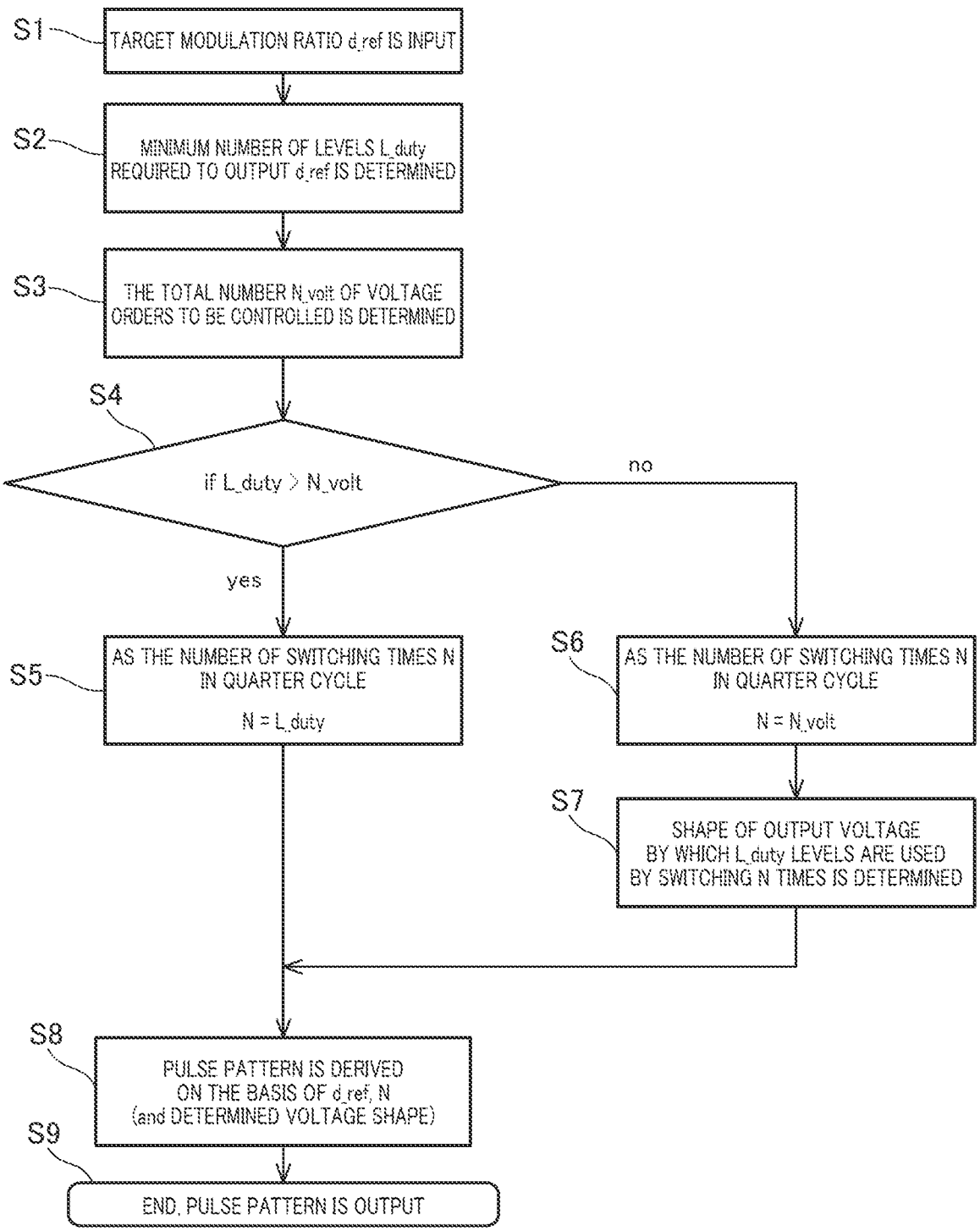
FIG. 3 is a flow chart for deriving a pulse pattern in the embodiment of the present invention.

FIG. 3 shows a flow chart of a deriving operation of the pulse pattern which is performed by the pulse pattern derivation unit. At step S1 in FIG. 3, a target modulation ratio d_ref (a modulation ratio command) is input (when driving the system of FIG. 2, a table closest to a command modulation ratio from the higher control unit 10 is adopted).

At step S2, a minimum number of levels L_duty required to output the target modulation ratio d_ref is determined.

This step S2 is a process for determining a minimum number of switching times required to output the target modulation ratio d_ref. The minimum number of switching times is fixed according to the required minimum number of levels L_duty. Even if an attempt is made to derive the pulse pattern that does not reach a minimum level required to output the target modulation ratio d_ref, the following conditional expression (2) concerning an output voltage fundamental wave cannot be satisfied.

Although the target modulation ratio d_ref may be defined by a desired definition, in the present embodiment 1, the target modulation ratio d_ref is defined by an expression (1) where vdc is a DC voltage per one level, L_high is a maximum output level of the power converter (a maximum number of output levels of the power converter), and V_ref is a fundamental wave amplitude of a target output voltage.

[Expression (1)]

$$d\_ref = \frac{V\_ref}{L\_high \times vdc} \quad (1)$$

Figure 4:
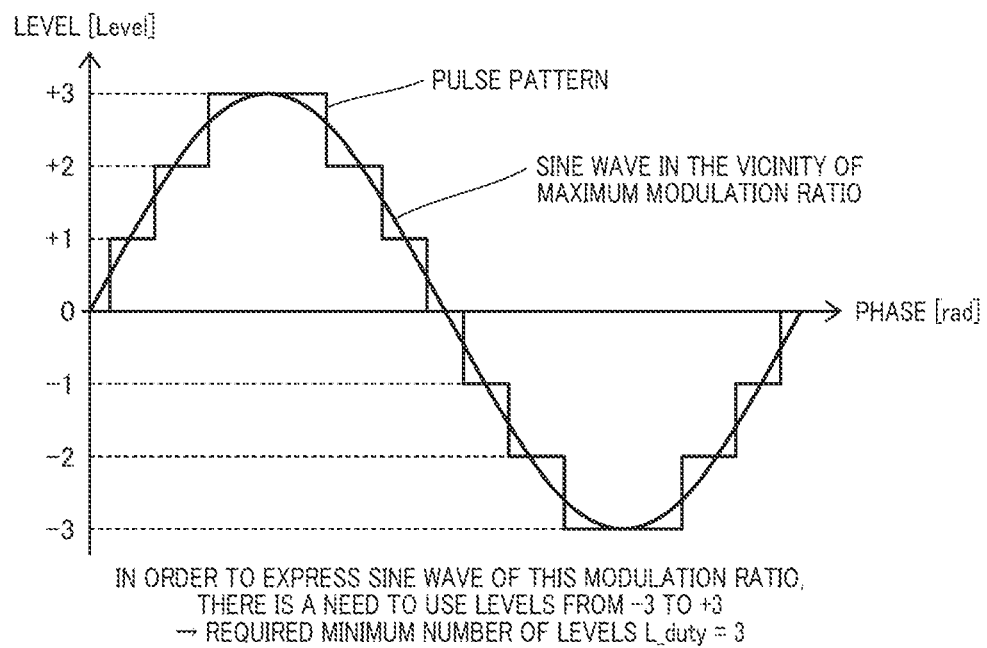
FIG. 4 is an explanatory diagram showing a relationship (1) between an output voltage of a seven-level inverter and a modulation ratio.

The "level" here is a level from a neutral point potential. Further, in the present embodiment 1, the required minimum number of levels L_duty is calculated by a voltage amplitude, but is not calculated by positive and negative peaks (peak to peak) of the voltage. For instance, as shown in FIG. 4, in a case of a seven-level inverter, it is considered that a center level is the neutral point potential, and −3, −2, −1, 0, 1, 2, 3 levels can be output. In addition, it is assumed that a minimum level L_duty required to output a fundamental wave in the vicinity of a maximum modulation ratio of this inverter is 3 (3 levels).

Next, a method of determining the minimum number of levels L_duty required to output the target modulation ratio at step S2 will be studied.

As shown in FIG. 4, in the vicinity of the maximum modulation ratio, clearly, it is not possible to output the voltage fundamental wave of the target modulation ratio unless all levels are used. However, when the modulation ratio is lower than this modulation ratio, it is conceivable that the waveform can be expressed using a small number of levels.

Therefore, consider the number of levels L_duty required to express a general target modulation ratio d_ref. According to the expression (1), a peak of the voltage fundamental wave of "d_ref=1.0" coincides with the maximum output level of the power converter. Conversely, it can be understood that an output of one level and the peak of the fundamental wave coincide with each other when d_ref is 1/L_high ("d_ref=1/L_high") using the maximum output level L_high of the power converter (the maximum number of output levels L_high of the power converter). From this, it is conceivable that each one level has an expressive power of a modulation ratio 1/L_high. That is, L_duty at step S2 is determined so as to satisfy an expression (2).

[Expression (2)]

$$\frac{L\_duty - 1}{L\_high} < d\_ref < \frac{L\_duty}{L\_high} \quad (2)$$

Figure 5:
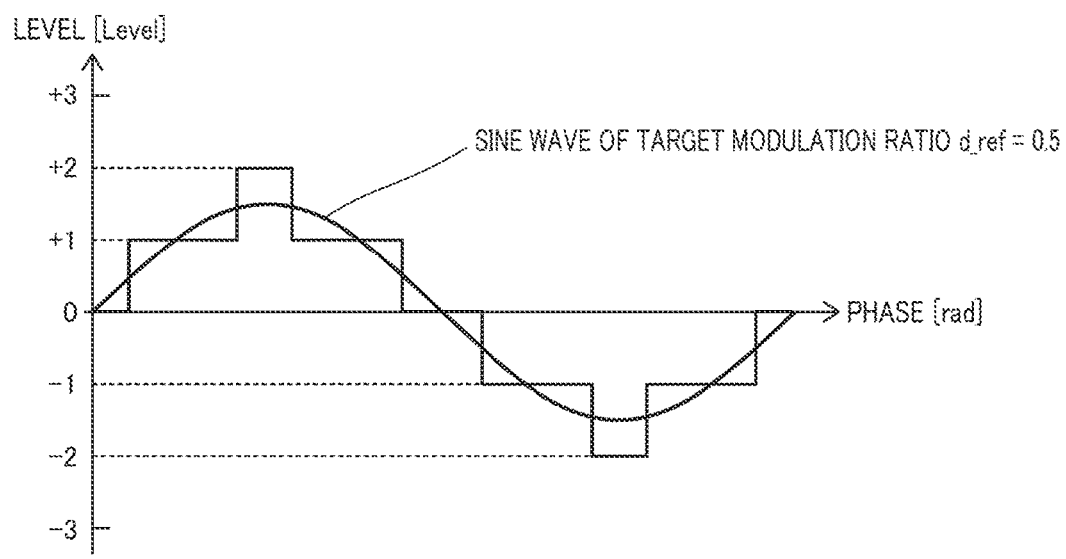
FIG. 5 is an explanatory diagram showing a relationship (2) between the output voltage of the seven-level inverter and the modulation ratio.

This is synonymous with defining the peak of the voltage fundamental wave so as to pass between L_duty level (=2) and (L_duty−1) level (=1) as shown in FIG. 5. From FIG. 5, when solving the expression (2) with "L_high=3" and "L_duty=2" for "d_ref=0.5", an expression (3) is obtained, and the conditional expression is satisfied.

[Expression (3)]

$$\frac{2-1}{3} = 0.333 < 0.5 < 0.667 = \frac{2}{3} \quad (3)$$

Next, consider a relationship between a voltage waveform using the minimum number of levels L_duty level and the number of switching times. In order to reach the L_duty level, switching at least L_duty times is necessary in the quarter cycle. In a case of the number of switching times less than this switching times, it is not possible to reach the L_duty level. Then, when the number of switching times in the quarter cycle is L_duty times, a direction of a level change in the quarter cycle is always positive. If there is a level change in a negative direction even once, it is not possible to reach the L_duty level by the switching L_duty times. When considering sinusoidal symmetry of the pulse pattern as a premise, as shown in FIGS. 4 and 5, the voltage waveform at this time is a waveform in which a slope (or an inclination) of a target sine wave and the direction of the level change always coincide with each other.

Next, at step S3, the total number of voltage orders to be managed (to be controlled) among the fundamental wave and the harmonics for the target modulation ratio is determined. This step S3 is a process for determining the number of switching times required to output a voltage of a desired quality. In Non-Patent Document 1, the method of deriving the pulse pattern in consideration of the voltage fundamental wave and the current harmonic is described. When expanding contents described in this Non-Patent Document 1 from the three-level to the multi-level and expressing this using setting of variables of the present invention, conditional expressions of an expression (4) and an expression (5) are obtained. The expressions (4) and (5) are results of Fourier series expansion on the premise of the sinusoidal symmetry of the voltage waveform. The expression (4) is the conditional expression concerning the voltage fundamental wave, and the expression (5) is the conditional expression concerning an nth-order voltage harmonic.

[Expression (4)]

$$d\_ref = \frac{4}{L\_high \cdot \pi}(\cos\theta_A + \cos\theta_B + \ldots + \cos\theta_N) \quad (4)$$

[Expression (5)]

$$V_n = \frac{4}{L\_high \cdot n\pi}(\cos n\theta_A + \cos n\theta_B + \ldots + \cos n\theta_N) \quad (5)$$

Here, d_ref indicates the target modulation ratio, Vn indicates a voltage nth-order harmonic amplitude, L_high indicates the maximum number of output levels of the power converter, N indicates the number of switching times in the quarter cycle, and θA and θB indicate respective switching phases of the pulse pattern. Regarding a sign before a cos function, if the direction of the level change by the switching is positive, the sign is +, whereas if the direction of the level change by the switching is negative, the sign is −.

When desiring to reduce the harmonic of the target modulation ratio, the switching phases (θA, θB, . . . , θN) in the quarter cycle are determined so as to reduce Vn for a desired order while maintaining a relationship of the expression (4). Once the switching phases in the quarter cycle are determined, remaining switching phases can be uniquely fixed from the sinusoidal symmetry.

Further, as described in Non-Patent Document 1, regarding the harmonic, in the light of an inductive load, the expression (5) may be considered as a conditional expression of a current harmonic of an expression (6).

[Expression (6)]

$$I_n = \frac{4}{L\_high \cdot n^2\pi}(\cos n\theta_A + \cos n\theta_B + \ldots + \cos n\theta_N) \quad (6)$$

Furthermore, regarding the harmonic order, when taking the symmetry of the voltage waveform and equilibrium of three phases into consideration, since even-order harmonics and harmonics that are multiples of 3 do not appear in the current, orders (n=5, 7, 11, 13, 17, 19, . . . ) that are multiples of 6±1 are considered.

As described above, it is possible to manage the fundamental wave and the harmonics of the pulse pattern, but this does not necessarily mean that the harmonics can be controlled to free values with the desired fundamental wave. For instance, it is generally not possible to set amplitudes of the harmonics of order 5, 7, 11, 13, 17, 19 to 0 in the expression (5) by the switching three times in the quarter cycle while maintaining the expression (4). This is because it is synonymous with trying to find a solution with three variations for seven equations (the fundamental wave and the six harmonics). To surely set the amplitudes of the desired harmonics to 0, variations of the number of harmonics to be suppressed +1 (for the fundamental wave) are required.

All harmonic orders to be suppressed and 1st order (the fundamental wave) are collectively called the voltage orders to be controlled in FIG. 3. By setting the number of switching times of the total number N_volt of voltage orders to be controlled in the quarter cycle, a pulse pattern in which the fundamental wave amplitude is set to d_ref and the amplitudes of the harmonics to be suppressed are set to 0 can be derived.

In the present invention, in order to ensure the voltage quality, the switching is performed at least N_volt times in the quarter cycle.

However, N_volt could be variable depending on the modulation ratio. For instance, in Patent Document 1, inconsideration of the fact that the pulse width becomes narrow in the low modulation ratio, the number of pulses (the number of switching times) is reduced. In addition, depending on a use of the motor, a voltage in the high modulation ratio may be used only at a high frequency, and depending on an L-component of a filter and the motor, it may not be necessary to take the voltage harmonic equal to or higher than a certain frequency into consideration.

In this case, regarding the low modulation ratio used at a low frequency, there is a need to consider the harmonics up to higher-order harmonics. On the other hand, regarding the high modulation ratio used at the high frequency, there is no need to especially suppress the higher-order harmonics, and only lower-order harmonics are taken into consideration. That is, in the high modulation ratio, N_volt can be set to be smaller than that in the low modulation ratio. When N_volt is reduced, the number of switching times is reduced, then improvement in efficiency can be expected by reduction in switching loss.

Next, at steps S4 to S6, processes for determining the number of switching times are performed. At steps S2 and S3, from two viewpoints of expression of the modulation ratio and suppression of the harmonics, the required minimum number of switching times L_duty and the total number N_volt of voltage orders to be controlled have been determined. At steps S4 to S6, these two are compared, and the larger one is set as the number of switching times N in the quarter cycle for the target modulation ratio d_ref.

That is, at step S4, a judgment of comparison between L_duty and N_volt is made. If L_duty is larger, L_duty is fixed as the number of switching times N in the quarter cycle at step S5. If N_volt is larger, N_volt is fixed as the number of switching times N in the quarter cycle at step S6.

Figure 6:
FIG. 6 is a waveform diagram showing an example of a shape of an output voltage in the embodiment 1 of the present invention.

Here, when a judgment result at step S4 branches off to step S6 where N_volt is adopted, a process for fixing a shape of the voltage is needed at step S7. Even though the required number of levels L_duty and the number of switching times N in the quarter cycle have been determined, there may be a plurality of types of the voltage forms. FIG. 6 is its example. As shown in FIG. 6, when L_duty is 2 ("L_duty=2") and N is 4 ("N=4"), two types of A and B are conceivable.

It is noted that a clearly undesirable shape such as a voltage form in which a negative voltage is output once is excluded here. When "N=N_volt" is fixed at step S6, a desired shape is selected from these voltage pulses and is used for the pulse pattern derivation. If the desired shape is determined, for instance, by referring to a waveform obtained by performing a triangular-wave comparison PWM, improvement in switching performance between the triangular-wave comparison PWM method and the fixed pulse pattern method can be expected. Further, instead of particularly selecting the specific shape, the pulse pattern derivation for all shapes of the output voltage may be performed at the following step S8, then the shape of the output voltage by which the harmonics can be suppressed more is adopted.

Here, when "N=L_duty" is fixed at step S5, as described at step S2, since the direction of the level change in the quarter cycle is always positive, the shape of the output voltage is uniquely fixed. Therefore, a process for determining the shape of the voltage is not needed.

Next, a process for deriving the pulse pattern is performed at step S8. At this step S8, on the basis of the target modulation ratio d_ref, the number of switching times N in the quarter cycle and the shape of the output voltage, simultaneous equations of the expression (4) given by the voltage fundamental wave and the expression (5) or the expression (6) given by the harmonics are solved, then the switching phases for N times are determined. At this time, although an aim is to set the harmonic amplitude to 0 in the above description of step S3, this is not necessarily required. Discussion of setting the harmonic amplitude to 0 is a guideline for determining N_volt, and the derivation to reduce the sum of the expression (5) or the expression (6) concerning a large number of n so that a large number of the harmonics can be suppressed on average could be possible.

From the switching phases and the shape of the voltage derived at step S8, a pulse pattern for one cycle is fixed, and is output at step S9. The pulse generation unit 20 of FIG. 2 tabulates the pulse pattern by which the output voltage level according to the target modulation ratio and the phase is determined.

By using the pulse pattern tabulated in this manner, it is possible to perform the control of the fixed pulse pattern by the optimum number of switching times.

It is noted that an important point of the pulse pattern derivation flow chart of FIG. 3 is that the number of switching times N in the quarter cycle is determined in consideration of the minimum level L_duty required to output the target modulation ratio, and N does not become less than L_duty. As long as this point is kept or observed, an object of comparison with L_duty at the branch point (step S4) is not necessarily required to be the total number N_volt of voltage orders to be controlled, and one or more other branch (a comparison judgment process) formed by another conditional expression may be provided for the pulse pattern derivation.

As an example of the other branch, it is a branch where regarding an upper limit N_loss of N which falls within a predetermined switching loss, N_loss and L_duty are compared.

As described above, according to the present embodiment 1, the pulse pattern with the optimum number of switching times according to the modulation ratio can be derived, and the control of the fixed pulse pattern method at the optimum number of switching times can be realized.

It is therefore possible to perform the control that surely achieves the expression of the fundamental wave in the high modulation ratio and perform the control that achieves the suppression of the harmonics in the middle to low modulation ratios.

Further, it is possible to solve the problem peculiar to the multi-level inverter which is that in order to output the maximum modulation ratio, a maximum voltage level must be output within one cycle of the output, which cannot be solved by the systems or methods of the prior art documents (Patent Document 1 and Non-Patent Document 1).

Embodiment 2

In an embodiment 2, the following change is made to the process of step S2 in which the minimum number of levels L_duty required to output the target modulation ratio d_ref is determined in the flow chart of FIG. 3 of the embodiment 1.

Regarding the triangular-wave comparison PWM, a voltage obtained by superimposing a third-order harmonic on a target voltage may be used. It is known that a utilization region of a DC voltage can be expanded by an appropriate superimposition of the third-order harmonic. As indicated by an expression (7), a maximum value of the target modulation ratio d_ref when superimposing the third-order harmonic having an amplitude of ⅙ of the fundamental wave is $2/\sqrt{3}$, and this is a maximum modulation ratio in which voltage saturation does not occur in all output phases.

[Expression (7)]

$$d\_ref \times \left(\sin\theta + \frac{1}{6}\sin3\theta\right) \quad (7)$$

Figure 7:
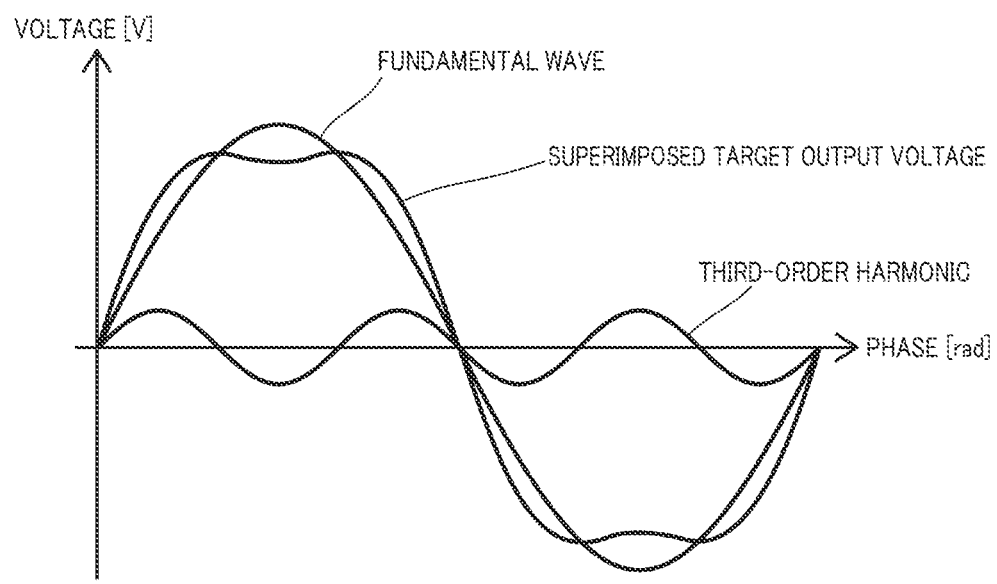
FIG. 7 is a waveform diagram for explaining expansion of a voltage utilization region by superimposition of a third-order harmonic in an embodiment 2 of the present invention.

In other words, by taking the superimposition of the third-order harmonic into consideration, the fundamental wave amplitude can be $2/\sqrt{3}$ times that of a target output voltage maximum value. This conceptual diagram is shown in FIG. 7. In FIG. 7, the maximum value of the superimposed target output voltage is lower than a maximum value of the fundamental wave.

In the light of this, as indicated by an expression (8), the high modulation ratio can be expressed by L_duty that is smaller than a value determined by the expression (2), and L_duty can be determined even when d_ref is 1.0 or more.

[Expression (8)]

$$\frac{2}{\sqrt{3}} \frac{L\_duty - 1}{L\_high} < d\_ref < \frac{2}{\sqrt{3}} \frac{L\_duty}{L\_high} \quad (8)$$

Figure 8:
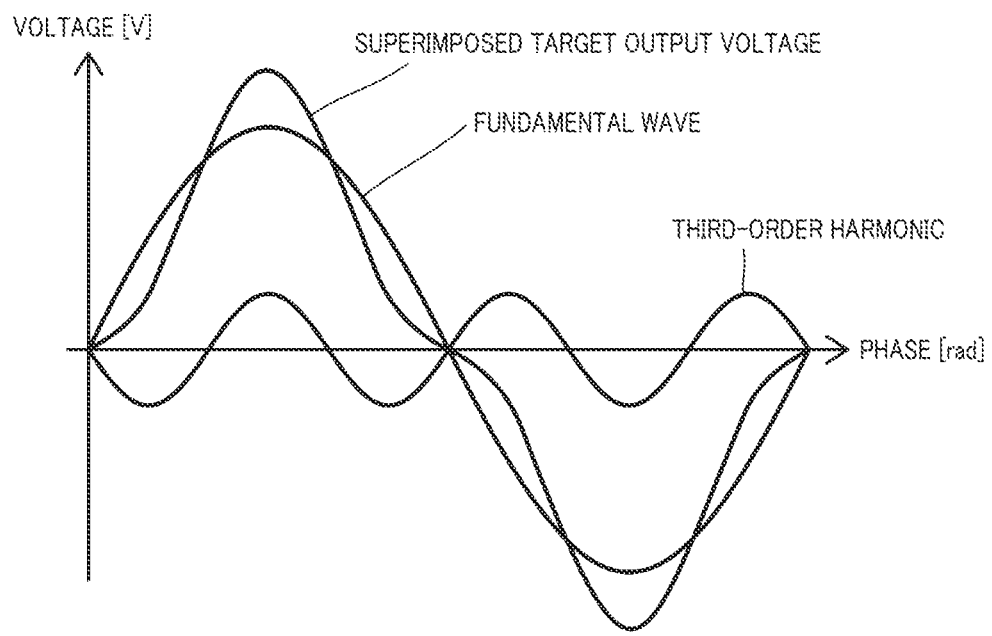
FIG. 8 is a waveform diagram for explaining the superimposition of the third-order harmonic in a reversed phase in the embodiment 2 of the present invention.

Further, by superimposing the third-order harmonic in a reversed phase, as shown in a conceptual diagram of FIG. 8, conversely, the target output voltage maximum value can be higher than the fundamental wave amplitude. For instance, in the multi-level inverter having ten levels or more, reduction in the harmonic is expected by an output voltage waveform close to a sine wave. However, in the low modulation ratio, only low levels are used, then the number of output levels is not different from those of a three-level inverter and a five-level inverter.

At this time, when taking the reversed-phase superimposition of the third-order harmonic into consideration, a region where the high levels can be used even in the low modulation ratio is expanded, then a harmonic reduction effect can be expected. If the third-order harmonic having an amplitude of K times that of the fundamental wave is superimposed in the reversed phase, since the maximum value of the output voltage is (1+K) times that of the fundamental wave, the expression (2) becomes an expression (9). When considering a maximum value with "n=3" in the expression (5), a range of K is determined by an expression (10). The reason why K is equal to or greater than 0 is because if K is less than 0, the superimposition does not become the reversed-phase superimposition.

[Expression (9)]

$$(1+K)\frac{L\_duty - 1}{L\_high} < d\_ref < (1+K)\frac{L\_duty}{L\_high} \quad (9)$$

[Expression (10)]

$$0 \le K \le \frac{4}{3\pi} \approx 0.42 \quad (10)$$

In this manner, the expression (2) could be used with the expression (2) being changed to the expression (8) or the expression (9) or combination of expressions (8) and (9) as necessary (the minimum number of levels L_duty required to output the target modulation ratio when superimposing the third-order harmonic on the fundamental wave could be determined so as to satisfy the expression (8) and/or the expression (9)). By doing this, it is possible to improve a voltage utilization rate and reduce the harmonics.

As described above, according to the present embodiment 2, improvement in the voltage utilization rate and reduction in the harmonics can be possible. That is, when the third-order harmonic is superimposed on the fundamental wave of the output voltage of the power converter, the high modulation ratio can be expressed by the required minimum number of levels that is smaller than that of the embodiment 1. In addition, when the third-order harmonic is superimposed in the reversed phase on the fundamental wave of the output voltage of the power converter, the region where the high levels can be used even in the low modulation ratio is expanded, then an excellent harmonic suppression effect can be expected as compared with the embodiment 1.

The present invention can be applied to a power converter having four levels or more. Further, the present invention can be applied to a serial multiplex inverter having five levels or more.

The invention claimed is:

1. A control system of a power converter by a fixed pulse pattern,
the system having a pulse pattern table in which a pulse pattern by which each output voltage level according to a target modulation ratio and a phase is determined is tabulated, configured to generate a gate signal based on the output voltage level, corresponding to commands of an input target modulation ratio and an input phase, of the pulse pattern table, and configured to control a semiconductor element of the power converter by the generated gate signal,
the control system comprising:
a pulse pattern derivation unit configured to
determine a minimum number of levels required to output the target modulation ratio,
determine a total number of voltage orders to be controlled among a voltage fundamental wave and harmonics of the power converter,
compare the determined required minimum number of levels and the determined total number of voltage orders to be controlled, and fix a larger one as a number of switching times (N) in a quarter cycle for the target modulation ratio,
based on the target modulation ratio and the fixed number of switching times (N) in the quarter cycle, determine switching phases for N times so as to be able to reduce a desired-order harmonic, with a voltage fundamental wave by an expression (4) being set for the target modulation ratio, in terms of harmonics by an expression (5) or an expression (6)

$$d\_ref = \frac{4}{L\_high \cdot \pi}(\cos\theta_A + \cos\theta_B + \ldots + \cos\theta_N) \quad (4)$$

$$V_n = \frac{4}{L\_high \cdot n\pi}(\cos n\theta_A + \cos n\theta_B + \ldots + \cos n\theta_N) \quad (5)$$

$$I_n = \frac{4}{L\_high \cdot n^2\pi}(\cos n\theta_A + \cos n\theta_B + \ldots + \cos n\theta_N) \quad (6)$$

(where d_ref is the target modulation ratio, Vn is a voltage nth-order harmonic amplitude, In is a current nth-order harmonic amplitude, L_high is a maximum number of output levels of the power converter, N is the number of switching times in the quarter cycle, θA . . . θN are respective switching phases, and regarding a sign before a cos function, if a direction of a level change by switching is positive, the sign is +, whereas if the direction of the level change by the switching is negative, the sign is −), and
based on the target modulation ratio and the determined switching phases for N times, derive the pulse pattern for one cycle by which each output voltage level according to the target modulation ratio and the phase is determined.

2. The control system of the power converter by the fixed pulse pattern as claimed in claim 1, wherein
the minimum number of levels required to output the target modulation ratio is determined so as to satisfy an expression (2)

$$\frac{L\_duty - 1}{L\_high} < d\_ref < \frac{L\_duty}{L\_high} \quad (2)$$

(where d_ref is the target modulation ratio, L_duty is the required minimum number of levels, and L_high is the maximum number of output levels of the power converter).

3. The control system of the power converter by the fixed pulse pattern as claimed in claim 1, wherein
the minimum number of levels required to output the target modulation ratio when superimposing a third-order harmonic on a fundamental wave of an output voltage of the power converter is determined so as to satisfy an expression (8) or an expression (9)

$$\frac{2}{\sqrt{3}}\frac{L\_duty - 1}{L\_high} < d\_ref < \frac{2}{\sqrt{3}}\frac{L\_duty}{L\_high} \quad (8)$$

$$(1+K)\frac{L\_duty - 1}{L\_high} < d\_ref < (1+K)\frac{L\_duty}{L\_high} \quad (9)$$

(where d_ref is the target modulation ratio, L_duty is the required minimum number of levels, L_high is the maximum number of output levels of the power converter, and K is a multiple of an amplitude of the harmonic with respect to the fundamental wave, and 0≤K).

4. The control system of the power converter by the fixed pulse pattern as claimed in claim 1, wherein
the total number of voltage orders to be controlled is set to a number of harmonics to be suppressed +1.

5. The control system of the power converter by the fixed pulse pattern as claimed in claim 1, wherein
the total number of voltage orders to be controlled is determined according to the target modulation ratio.

6. The control system of the power converter by the fixed pulse pattern as claimed in claim 1, wherein
when the total number of voltage orders to be controlled is fixed as the number of switching times in the quarter cycle for the target modulation ratio, one of shapes of an output voltage of the power converter, which are determined by the required minimum number of levels and the fixed number of switching times in the quarter cycle, is selected.

7. The control system of the power converter by the fixed pulse pattern as claimed in claim 1, wherein
when the total number of voltage orders to be controlled is fixed as the number of switching times in the quarter cycle for the target modulation ratio, pulse pattern derivation for all shapes of an output voltage of the power converter, which are determined by the required minimum number of levels and the fixed number of switching times in the quarter cycle, is performed by the pulse pattern derivation unit, and a shape of the output voltage of the power converter by which the harmonics can be suppressed more is adopted.

8. The control system of the power converter by the fixed pulse pattern as claimed in claim 1, wherein
the power converter is a power converter having four levels or more.

9. The control system of the power converter by the fixed pulse pattern as claimed in claim 1, wherein
the power converter is a serial multiplex inverter having five levels or more.

10. A method of controlling a power converter by a fixed pulse pattern for controlling a semiconductor element of the power converter by a pulse pattern by which each output voltage level according to a target modulation ratio and a phase is determined, the method comprising:
a step of determining a minimum number of levels required to output the target modulation ratio;
a step of determining a total number of voltage orders to be controlled among a voltage fundamental wave and harmonics of the power converter;
a step of comparing the determined required minimum number of levels and the determined total number of voltage orders to be controlled, and fixing a larger one as a number of switching times (N) in a quarter cycle for the target modulation ratio;
a step of, based on the target modulation ratio and the fixed number of switching times (N) in the quarter cycle, determining switching phases for N times so as to be able to reduce a desired-order harmonic, with a voltage fundamental wave by an expression (4) being set for the target modulation ratio, in terms of harmonics by an expression (5) or an expression (6)

$$d\_ref = \frac{4}{L\_high \cdot \pi}(\cos\theta_A + \cos\theta_B + \ldots + \cos\theta_N) \quad (4)$$

$$V_n = \frac{4}{L\_high \cdot n\pi}(\cos n\theta_A + \cos n\theta_B + \ldots + \cos n\theta_N) \quad (5)$$

$$I_n = \frac{4}{L\_high \cdot n^2\pi}(\cos n\theta_A + \cos n\theta_B + \ldots + \cos n\theta_N) \quad (6)$$

(where d_ref is the target modulation ratio, Vn is a voltage nth-order harmonic amplitude, In is a current nth-order harmonic amplitude, L_high is a maximum number of output levels of the power converter, N is the number of switching times in the quarter cycle, θA . . . θN are respective switching phases, and regarding a sign before a cos function, if a direction of a level change by switching is positive, the sign is +, whereas if the direction of the level change by the switching is negative, the sign is −);
a step of, based on the target modulation ratio and the determined switching phases for N times, deriving the pulse pattern for one cycle by which each output voltage level according to the target modulation ratio and the phase is determined;
a step of tabulating the derived pulse pattern;
a step of generating a gate signal based on the output voltage level, corresponding to commands of an input target modulation ratio and an input phase, of a pulse pattern table in which a pulse pattern is tabulated by the step of tabulating the pulse pattern; and
a step of controlling the semiconductor element of the power converter by the generated gate signal.

* * * * *